US005192385A

United States Patent [19]

Moll

[11] Patent Number: 5,192,385

[45] Date of Patent: Mar. 9, 1993

[54] METHOD FOR THE APPLICATION OF LENGTHS OF TAPE TO A SURFACE

[75] Inventor: Karl-Andreas Moll, Kaarst, Fed. Rep. of Germany

[73] Assignee: Minnesota Mining and Manufacturing Company, St. Paul, Minn.

[21] Appl. No.: 922,346

[22] Filed: Jul. 29, 1992

Related U.S. Application Data

[60] Continuation of Ser. No. 738,535, Jul. 31, 1991, abandoned, which is a division of Ser. No. 345,634, May 1, 1989, Pat. No. 5,068,004.

[51] Int. Cl.[5] .............................................. B32B 31/18

[52] U.S. Cl. .................................... 156/250; 156/252; 156/494; 156/513; 156/517; 156/519; 156/521; 156/522; 156/523; 156/574; 156/577; 156/579

[58] Field of Search ............... 156/250, 252, 494, 495, 156/510, 517, 519, 521, 522, 523, 527, 574, 577, 579; 225/2, 4, 5, 10, 11, 51, 72, 73, 82, 84, 88, 89, 91, 93, 94, 96, 96.5, 100, 106

[56] References Cited

U.S. PATENT DOCUMENTS

| | | | |
|---|---|---|---|
| 2,956,484 | 10/1960 | Subklew | 225/96 |
| 3,125,263 | 3/1964 | Harbour | 225/73 |
| 3,178,329 | 4/1965 | Rohbogner | 156/250 |
| 3,393,114 | 7/1968 | Jorgensen | 156/577 |
| 3,553,049 | 1/1971 | Wolff | 156/250 |
| 3,850,779 | 11/1974 | Pearson | 156/523 |
| 3,902,956 | 9/1975 | Thompson, Jr. | 156/523 |
| 3,969,180 | 7/1976 | Ravesloot | 225/96 |
| 4,026,754 | 5/1977 | Bogdanski et al. | 156/521 |
| 4,371,410 | 2/1983 | Stevens | 156/117 |
| 4,447,482 | 5/1984 | Heinzelman et al. | 428/42 |
| 4,585,509 | 4/1986 | Obayashi | 156/497 |
| 4,636,276 | 1/1987 | Nozaka | 156/353 |
| 4,743,325 | 5/1988 | Miyake | 156/250 |

FOREIGN PATENT DOCUMENTS

| | | |
|---|---|---|
| 1291463 | 12/1965 | Fed. Rep. of Germany . |
| 1295386 | 3/1961 | France . |
| 2046699 | 3/1980 | United Kingdom . |

OTHER PUBLICATIONS

Brochure entitled "Model FSA 100, Automatic Production and Test Equipment," Straub Design Company, undated, two pages.

Brochure entitled "Scotch Brand ®, Flat Surface Applicator S-601 and S-6012," undated, four pages.

*Primary Examiner*—Caleb Weston
*Attorney, Agent, or Firm*—Gary L. Griswold; Walter N. Kirn; Mark W. Binder

[57] ABSTRACT

The invention relates to a process and to apparatus for the defined dispensing and application to a substrate surface of sections having equal and/or unequal lengths of a tape, particularly of a pressure-sensitive or thermally activatable adhesive tape, to a substrate surface. To this end, the tape is continuously adhesively affixed to the surface. Starting at an initial placement position; before the leading edge (in the direction of application) of the tape section is secured, it is severed partly, leaving at least one web of material, at a predetermined distance from the trailing edge thereof by a specially configured cutting mechanism. After the subsequent adhesive placement of the entire tape section on said surface, the tape is separated at said at least one web of material by utilizing a braking effect as the tape or the tape dispensing and applying apparatus continues to move relative to the surface.

3 Claims, 4 Drawing Sheets

1
A
2
3
13
12
5
9
8
6
11
12a
7
10
3

15
4
a
14
B
16
16a
a

METHOD FOR THE APPLICATION OF LENGTHS OF TAPE TO A SURFACE

This application is a continuation of Ser. No. 07/738,535, filed Jul. 31, 1991, abandoned, which in turn is a division of Ser. No. 07/345,634, filed May 1, 1989, now U.S. Pat. No. 5,068,004.

TECHNICAL FIELD

This invention relates to a method for applying lengths of tape to a surface and to apparatus for performing the method.

BACKGROUND ART

For sealing and holding purposes, it has been known to apply pressure-sensitive foam adhesive tapes or adhesive tapes supported on a liner. Conventionally, such application is performed by means of manually operable tape dispensing and applying de vices or by means of apparatus which is attached to the surface automatically and is driven by electric, pneumatic or equivalent means. For applying lengths of tape to a substrate using the prior apparatus, the trailing edge (in the direction of tape application) of the length of tape is affixed to the substrate, the desired length of tape withdrawn and the leading edge of the tape length then severed from the tape supply. In many cases, this procedure prevents the leading tape edge from being adhered in a clean and precise manner. This drawback is particularly apparent when the task is to place foam adhesive tapes for securing sheet metal coatings to vehicle frame elements; such tapes must be placed continuously and accurately in precise locations.

It has been known to prepare these foam tapes together with the subjacent liner for use in such a manner that the foam portion is severed and the supporting liner scored at the surface thereof. In the use of the foam material, the full length of the scored liner remains as waste. It is necessary to wind it up or to dispose of it as is; both methods are cumbersome.

DISCLOSURE OF THE INVENTION

The present invention provides a method for applying lengths of tape to a surface of and apparatus for performing that method, such that sections of a tape having equal or unequal lengths, in particular of a liner-supported pressure-sensitive foam tape or of an adhesive tape, can be applied manually or automatically in a simple manner to surfaces in a well-defined and precise manner without excessive tape lengths being left over before and/or behind the trailing or leading edge of the tape section to be applied.

A particular feature of the invention is that, prior to the entire tape section being applied to the substrate surface, the tape is severed partly, leaving one or several webs of tape material disposed in the severing plane. Thereafter, the tape section is continuously affixed to the substrate surface without problems up to the severing line previously formed, and the severing of the webs takes place during a brief interruption of the movement of the tape supply relative to the surface. In this manner, the desired precise application of the tape is possible in reliable manner with both manually operated and automatic devices and the drawbacks of the prior devices have been eliminated.

BRIEF DESCRIPTION OF DRAWINGS

The inventive process and apparatus will now be explained under reference to the accompanying drawings.

DETAILED DESCRIPTION

Figure 1:
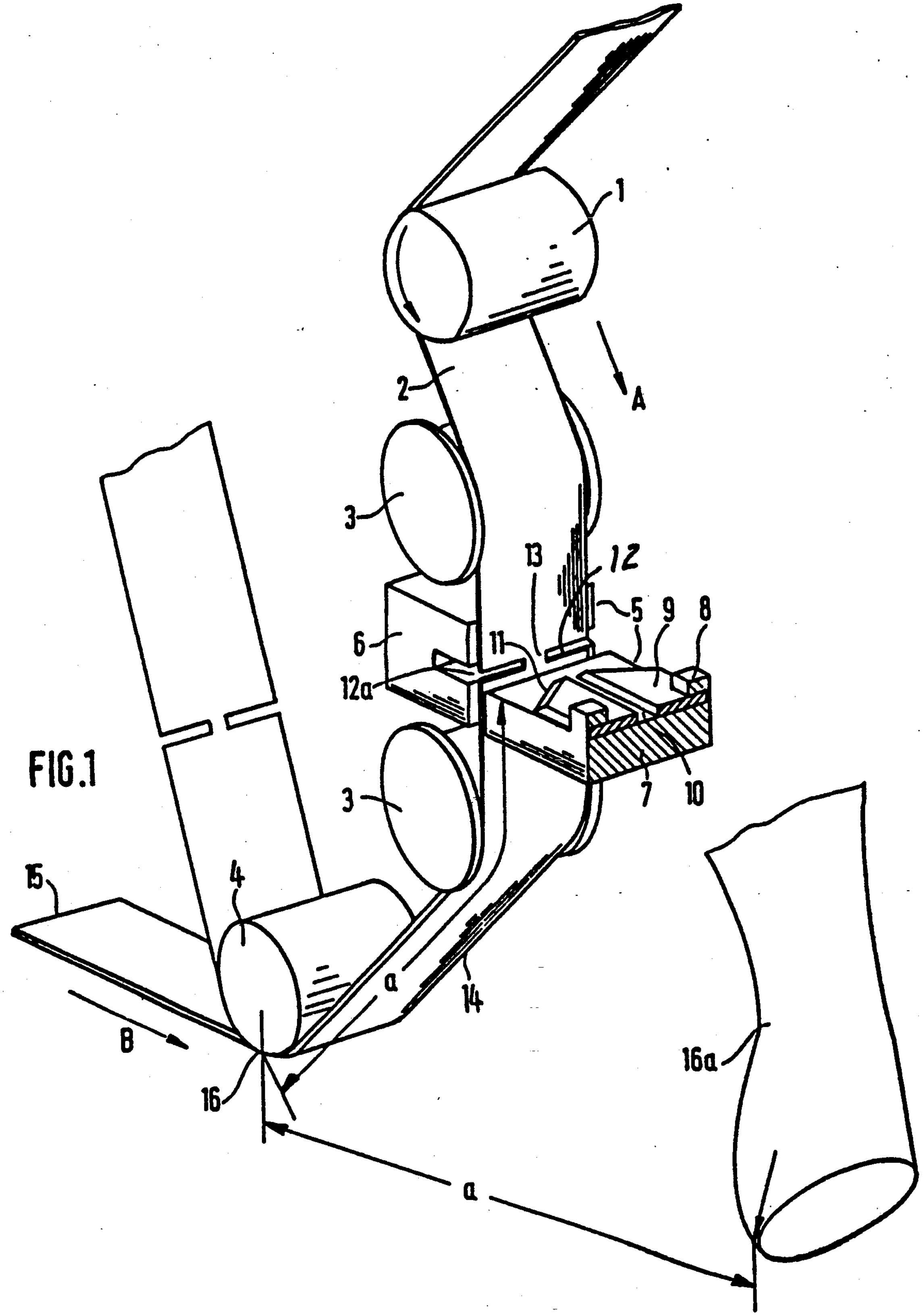
FIG. 1 is a partial perspective view of a tape dispensing and applying apparatus according to the present invention.

As shown in FIG. 1, the tape dispensing and applying apparatus of this invention comprises a tape feeding roll 1 from which the tape 2 runs in the direction of arrow A over two spaced tape guiding rolls 3 to a downstream tape dispensing roll 4. All these rolls are mounted in a casing (not shown) of the tape dispensing and applying apparatus, which may be in the form of a device adapted to be applied to a surface by hand or in the form of an automatically driven mechanism. Arrow B in FIG. 1 shows the direction of discharge of tape 2 towards the surface of an article to be processed during the movement thereof relative to the surface. In FIG. 1, tape guiding rolls 3 are disposed inside the casing in a mutual relationship such that tape 2 runs between them in a vertical direction as tape discharge roll 4 is applied to a horizontal surface.

Figure 2:
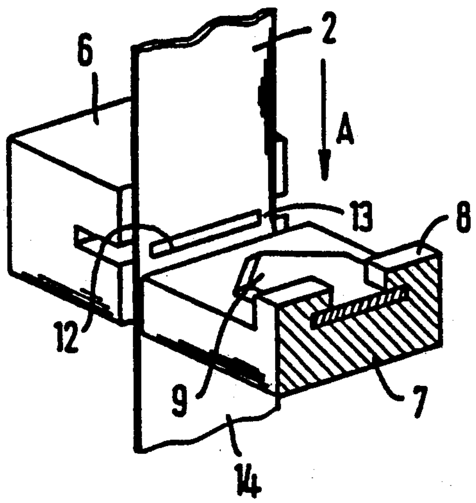
FIGS. 2 and 3 show perspective views of alternate embodiments of the cutting mechanisms of the tape dispensing and applying device of the invention.
Figure 3:
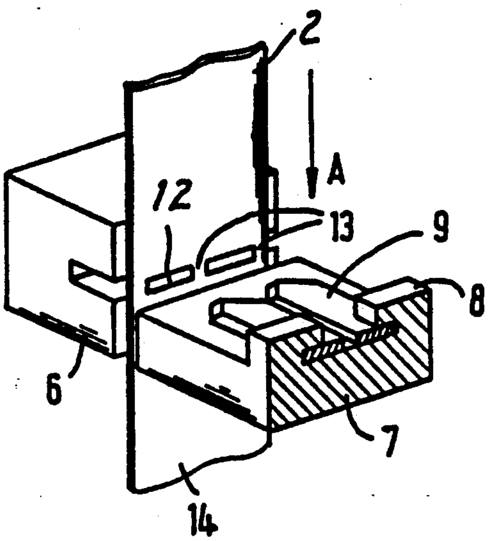

There is disposed between tape guiding rolls 3 a cutting mechanism 5 comprising an anvil 6 and a knife assembly 7 spaced on either side of the tape run. Knife assembly 7 comprises a guiding holder 8 for knife 9 which in the embodiment of cutting mechanism 5 shown in FIG. 1 is formed in two parts such that the two parts are separated by a central slot. Anvil 6 has formed therein a groove 12*a* directed towards cutting edge 11 of knife 9, said groove being adapted to receive the cutting edge of knife 9 as cutting mechanism 5 is being operated. Operation of the embodiments of cutting mechanism 5 shown in FIGS. 1 to 3 results in the formation of a tear line 12 by tape 2 being partly severed as it runs through between anvil 6 and knife assembly 7. Alternatively, cutting mechanism 5 can have such a structure that tear line 12 is formed in tape 2 by the latter being scored to a sufficient depth.

FIG. 1 shows the condition of cutting mechanism 5 directly after it has been actuated. In the process, it has formed in the tape in the plane of the tearing or cutting line a central web of material 13 having a thickness equal to the thickness of tape 2. In the view shown in FIG. 2, knife 9 is a one-piece structure and so dimensioned and guided in knife assembly 7 that the actuation of cutting mechanism 5 causes two lateral material webs 13 of equal widths to be formed in the plane of the tear line. In the embodiment of cutting mechanism 5 shown in FIG. 3, knife 9 has two parts as in FIG. 1, but dimensioned and guided in the knife assembly in such a manner that actuation of cutting mechanism 5 causes one central and two lateral material webs 13 to be formed in the plane of tear line 12, said webs having identical widths equal to the thickness of tape 2. Thus, in the embodiments of cutting mechanism 5 shown in FIGS. 1 to 3, the actuation thereof will always result in tape 2 being partly cut through. Further, the tape dispensing and applying apparatus shown in FIG. 1 comprises a mechanism (not shown in FIG. 1) for terminating the tape dispensing process and a mechanism (also not shown) adapted to be combined with cutting mechanism 5 in a manner to provide a tear line 12 in tape 2 at a predetermined distance from trailing edge 15 (in the direction B of application of tape section 14). FIG. 1 shows the tape dispension and applying apparatus in an operative status in which trailing edge 15 of tape section 14 has already been affixed adheringly to the substrate surface and tape section 14 has partly been placed on the surface in the process of its continued application. When tear line 12 reaches application line 16 as tape 2 moves continuously in the dispensing direction (arrow A) through the tape dispensing and applying apparatus, the combined cutting and braking mechanism 17 included in the embodiment shown in FIGS. 4 to 8 can discontinue the dispensing of tape 2 in that instant so that tear line 12 and are severed as tape 2 and the tape dispensing and applying apparatus continue their relative movement while leading edge 18 (in the direction B of tape application) of tape section 14 is being fixed. The metering mechanism combined with cutting mechanism 5 is preferably adjusted so that tape sections 14 having equal and/or unequal lengths may be applied consecutively to the substrate surface in a well-defined manner. As a consequence, the activation of knife 9 in knife assembly 7 is controlled in accordance with the adjustment of the metering mechanism.

A simple metering mechanism of the type included in the embodiment shown in FIG. 1 may be realized e.g. in a manually operated device by distance a between groove 12a in anvil 6 and application line 16 corresponding constructionally to the distance between application line 16 and the end of the handle shown schematically at 16a; equal or unequal distances/lengths a may be realized by simple mechanical means for automatic operation as well.

Further as shown in FIG. 1, once tape section 14 has been applied continuously up to tear line 12, material webs 13 along tear line 12 can be severed also without operating a braking mechanism because the oppositely directed force components of the adhesion force acting between the substrate surface and tape 2 and of the tensile force which continues to act on tape 2 in direction of application B, the tape will be separated at material webs 13 of tear line 12 as leading edge 15 (in the direction of application B) forms.

FIGS. 4 to 8 show perspective views of a combined cutting and braking mechanism 17 in another embodiment of the inventive tape dispensing and applying apparatus, with each said Figures showing another operating position in accordance with consecutive process steps. A holder 19 guides a cylinder 20 assembly for movement in directions normal to the path of tape movement, said cylinder assembly comprising a bottom braking cylinder 21 and a top cutting cylinder 22 interconnected by a restoring compression spring 23 disposed therebetween so that their longitudinal axes coincide with the longitudinal axis of guiding holder 19. In the operation of the combined cutting and braking mechanism, two compressive forces of different magnitude act on cylinder assembly 20 in directions normal to the path of tape movement. A guide bar 24 of knife 9 extends along said longitudinal axis through cutting cylinder 22 and extends into braking cylinder 21. Cutting cylinder 22 serves as an entrainment for guide bar 24 of knife 9 during the downward movement thereof. Knife 9 has a recess 25 centrally disposed along cutting edge 11, the depth of that recess corresponding to the thickness of tape 2 at the most. Adjacent the tape side opposite guiding holder 19, there is provided anvil 6 having therein groove 12a aligned with knife 9. Braking cylinder 1 and cutting cylinder 22 both have in their peripheral surface two radially aligned slots 27 that extend from the bottom edges thereof. The mutually corresponding slots 27 of braking cylinder 21 and of cutting cylinder 22 lie in the same vertical plane.

Figure 4:
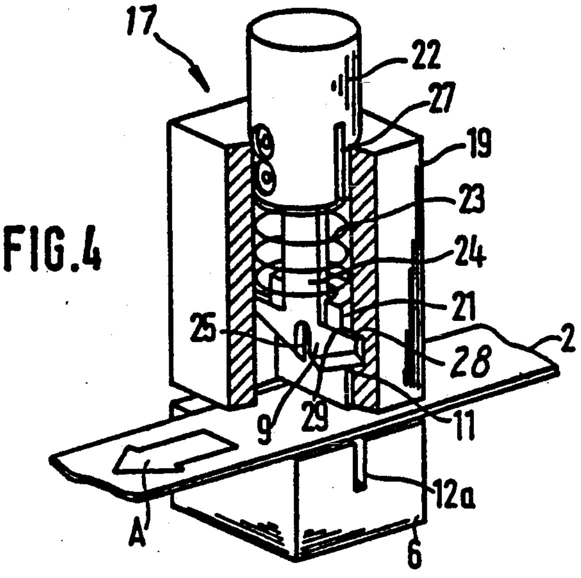
FIGS. 4, 5, 7 and 8 show perspective views partly in section.

At the lower end of guide rod 24, knife 9 is attached so as to be be guided in slots 27 in braking cylinder 21. As shown in FIG. 4, an edge 28 of knife 9 facing away from cutting edge 11 serves to entrain braking cylinder 21 when knife 9 moves upwardly as edge 28 will engage bottom wall 29 of slots 27 in braking cylinder 21 in that case.

FIG. 4 shows the cutting and braking mechanism 17 in its first and rest position, in which tape 2 is being pulled through between knife 9 and anvil 6 of mechanism 17 (see arrow A—"Tension") as it is being applied to the substrate surface. In this rest position, cutting cylinder 22 is urged by restoring compression spring 23 to its topmost position, and braking cylinder 21 is retained in its topmost Position, too, by edge 28 of knife 9 engaging bottom wall 29 of slots 27 of lower braking cylinder 21.

Figure 5:
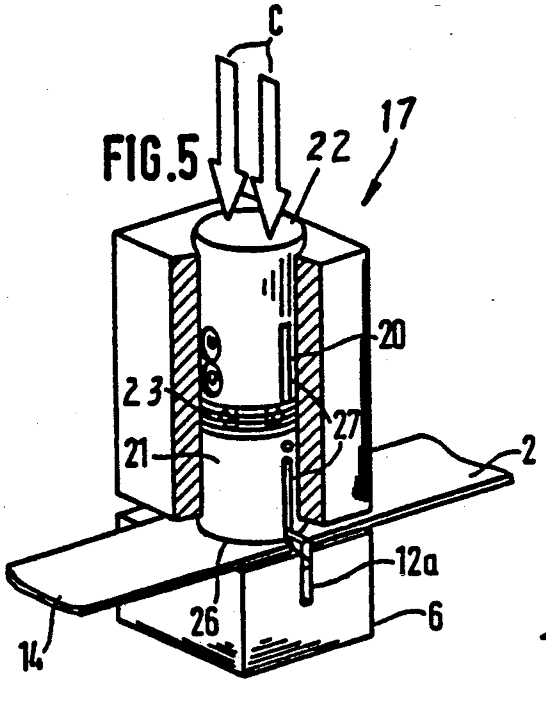

FIG. 5 shows cutting and braking mechanism 17 in its second operating position in which a relatively high force (see arrow C) acts on cutting cylinder 22 in a direction normal to the path of tape movement; the cylinder is moved against braking cylinder 21 and together with it against anvil 6 as spring 23 is compressed, with braking cylinder 21 urging tape 2 onto anvil 6 and stopping its dispensing movement. Directly afterwards, the entrainment of guide bar 24 by cutting cylinder 22 causes knife 9 to be pressed through tape 2 as it forms tear line 12, i.e. knife 9 partly cuts through tape 2 and enters the slot in anvil 6 which is aligned therewith. Given the present configuration of knife 9, it leaves a central web of material in the tape, as shown in FIG. 6.

Figure 6:
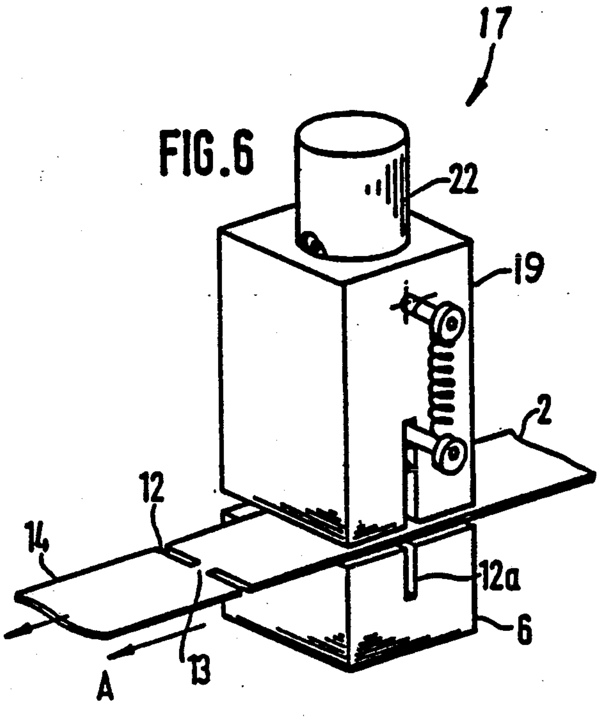
FIG. 6 shows a perspective view of the combined cutting and braking mechanism in the tape dispensing and applying device of this invention in various consecutive stages of the inventive process.

In FIG. 6, braking and cutting mechanism 17 is in its third position, i.e. again a rest position, and the tension force acting on it moves tape 2 in the dispension direction, as is shown by tear line 12 emerging from the cutting station and by arrow A—"Tension".

Figure 7:
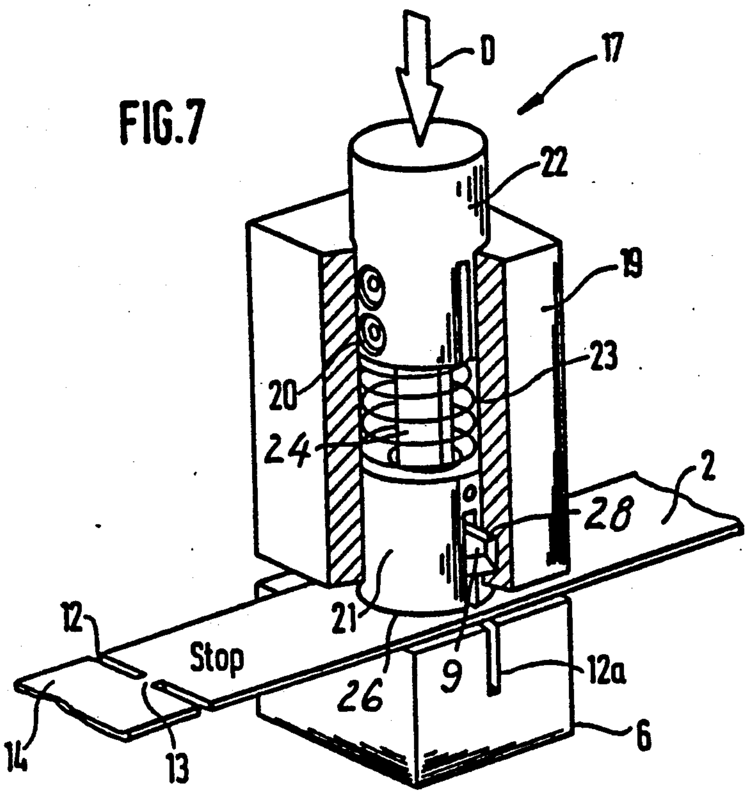
Figure 8:
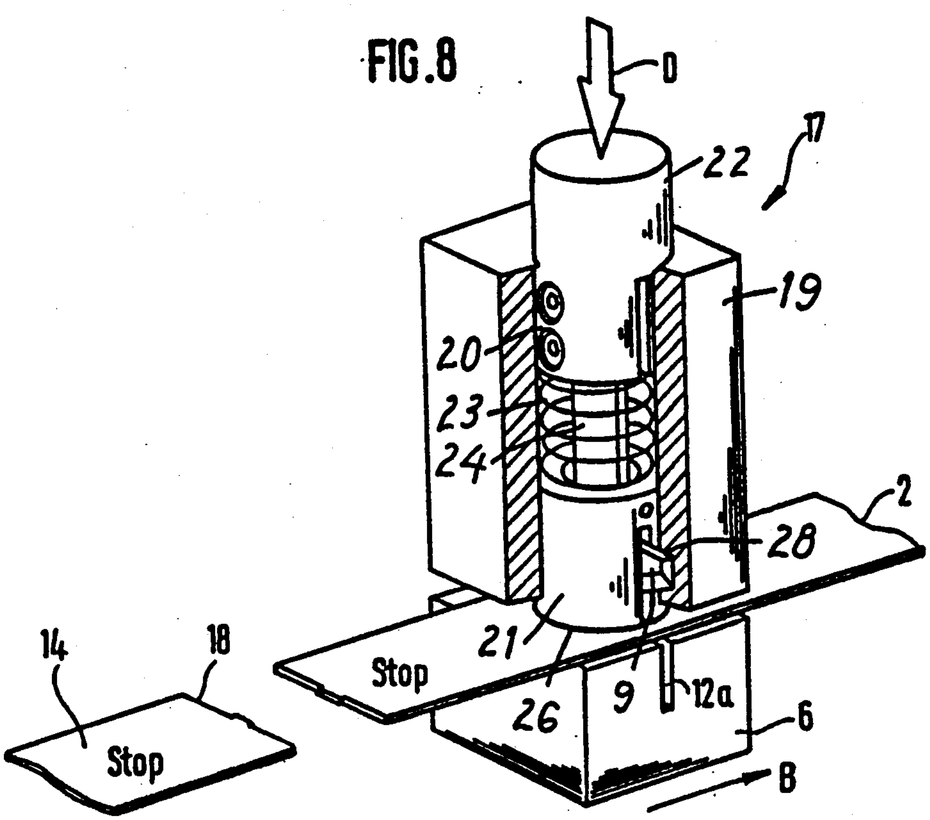

FIGS. 7 and 8 illustrate the operation of braking cylinder 21 in cutting and braking mechanism 17.

FIG. 7 shows the fourth operating position of cutting and braking mechanism 17, in which it has a second force (normal to the path of tape movement) applied to it through (top) cutting cylinder 22, said second force being shown by arrow D and having a lower magnitude that said first force (double arrow C). This way, cutting cylinder 22 is moved against anvil 6 while restoring spring 23 is compressed slightly only. with braking cylinder 21 retaining tape 2 in position on anvil 6 and thus stopping its dispensing movement.

FIG. 8 shows the fifth operating position, in which the retaining effect is utilized to separate the tape at material web 13 as tape 2 or the tape dispensing and applying apparatus, respectively, continues its movement. In that position, as shown in FIGS. 7 and 8, knife 9 is moved downwardly towards the tape guiding structure because spring 23 has been compressed slightly from the rest position of cutting and braking mechanism 17; knife 9 will not touch tape 2, however.

I claim:

1. A method for the application of tape having a desired length to a surface by a tape applicator device including a tape applicator element for placing a trailing edge of the tape onto the surface and a tear lien forming element, comprising the steps of:

(a) adhering the trailing edge of a section of the tape tot he surface at a given application line;

(b) applying a portion of a desired length of the tape to the surface;

(c) metering the distance between the applied length of tape and a desired leading edge of the tape by comparing an indicator provided on the tape applicator device to a desired point on the surface for the leading edge of the tape to be located;

(d) interrupting the movement of the tape at a predetermined point from the desired leading edge of the tape;

(e) forming a tear line in the tape by the tear line forming element at the predetermined distance from the desired leading edge of the tape;

(f) applying the remaining portion of the tape to the surface; and (g) tearing the tape at the tear line so as to separate the desired length of tape from the section of tape.

2. The method of claim 1, wherein the step of forming the tear lien includes the step of partially severing the tape while at least one web of the tape material is formed.

3. The method of claim 1, wherein the step of forming the tear line includes the step of forming the tear line in a direction normal to the longitudinal edges of the tape.

* * * * *

UNITED STATES PATENT AND TRADEMARK OFFICE

CERTIFICATE OF CORRECTION

PATENT NO. : 5,192,385

DATED : March 09, 1993

INVENTOR(S) : Karl-Andreas Moll

It is certified that error appears in the above-indentified patent and that said Letters Patent is hereby corrected as shown below:

Column 5, line 7, "lien" should read --line--.

Column 5, line 10, "tot he" should read --to the--.

Column 6, line 12, "lien" should read --line--.

Signed and Sealed this

Second Day of May, 1995

Attest:

BRUCE LEHMAN

*Attesting Officer* — *Commissioner of Patents and Trademarks*